(No Model.) 8 Sheets—Sheet 1.

D. WIGGINS.
VELOCIPEDE.

No. 358,178. Patented Feb. 22, 1887.

Witnesses.
Jo. L. Coombs
Robert Everett

Inventor.
David Wiggins
By James L. Norris.
Atty.

(No Model.) 8 Sheets—Sheet 2.
D. WIGGINS.
VELOCIPEDE.
No. 358,178. Patented Feb. 22, 1887.
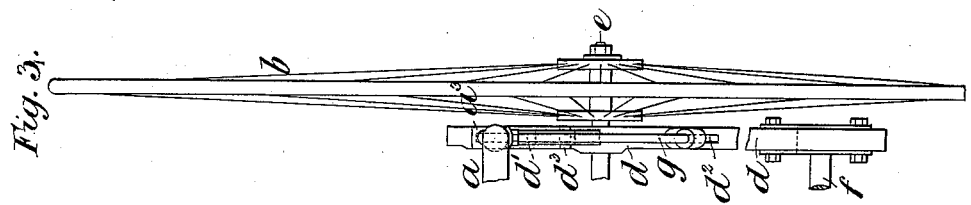
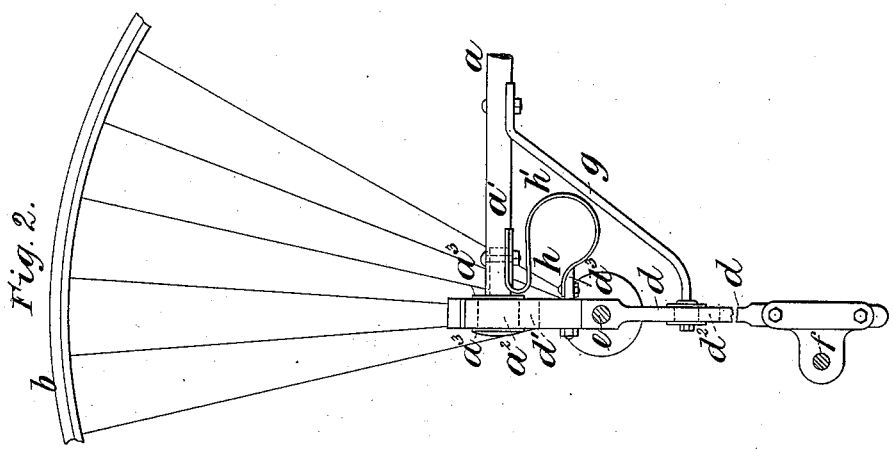
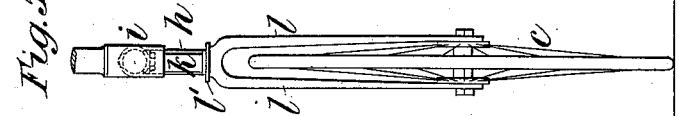
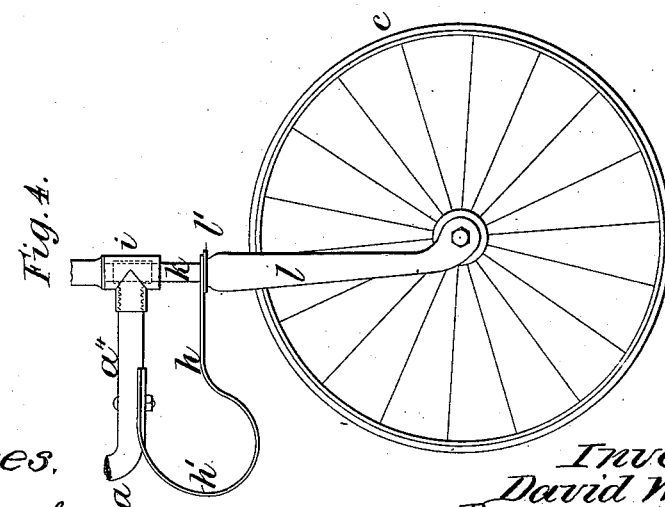
Witnesses,
Jo. L. Coombs
Robert Everett
Inventor,
David Wiggins.
By James L. Norris
Atty.

(No Model.)
D. WIGGINS.
VELOCIPEDE.
No. 358,178. Patented Feb. 22, 1887.
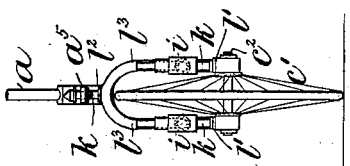
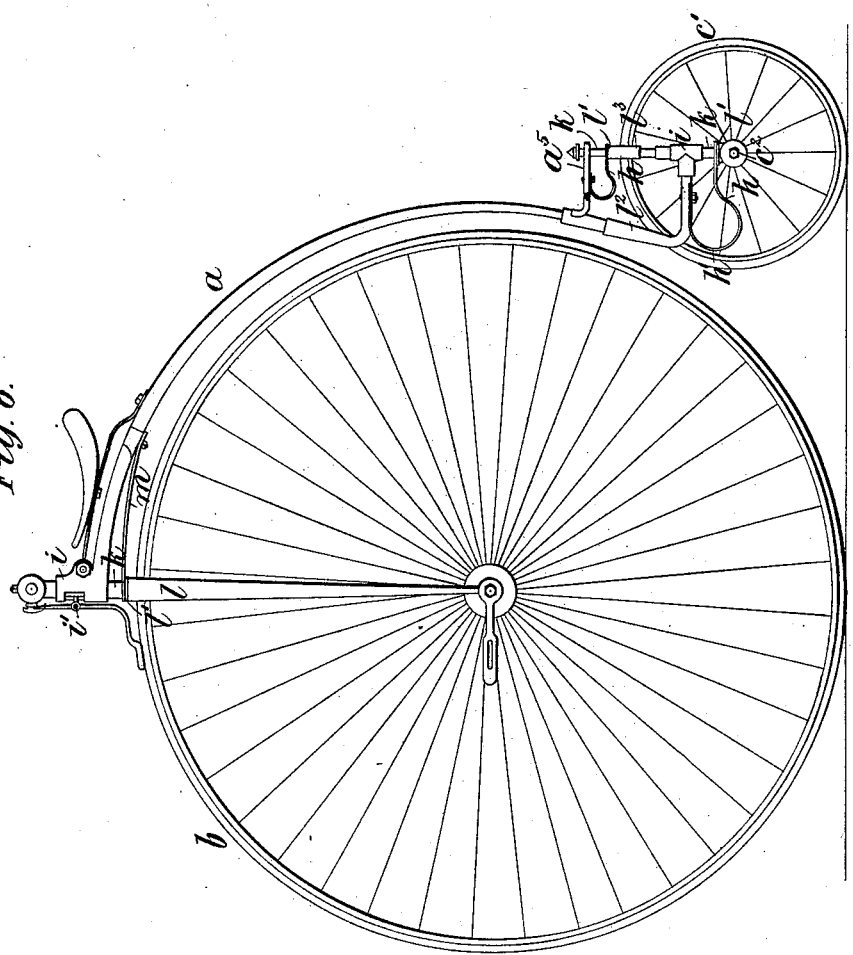
Witnesses.
Jo. L. Coombs
Robert Everett
Inventor:
David Wiggins,
By James L. Norris.
Atty.

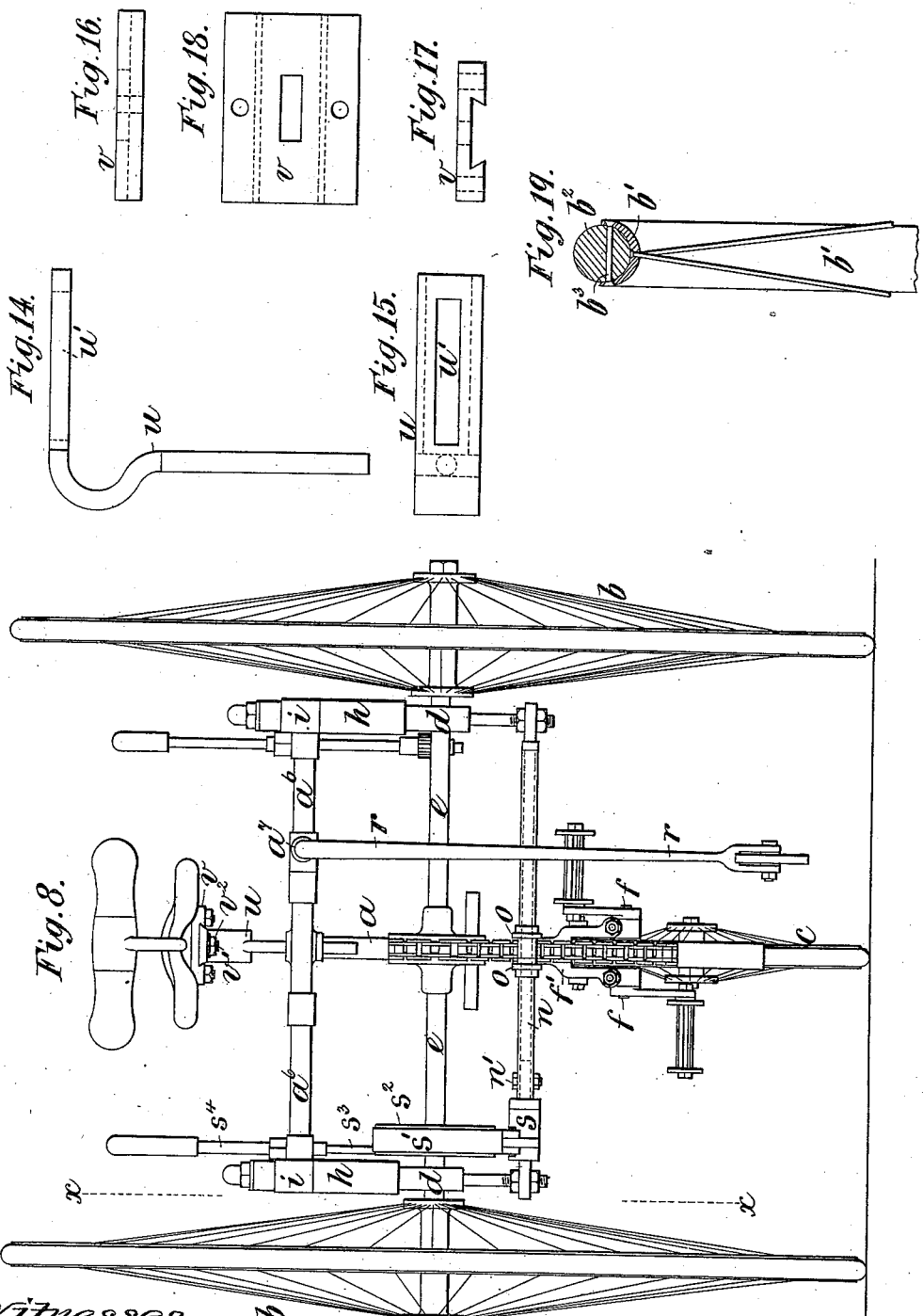

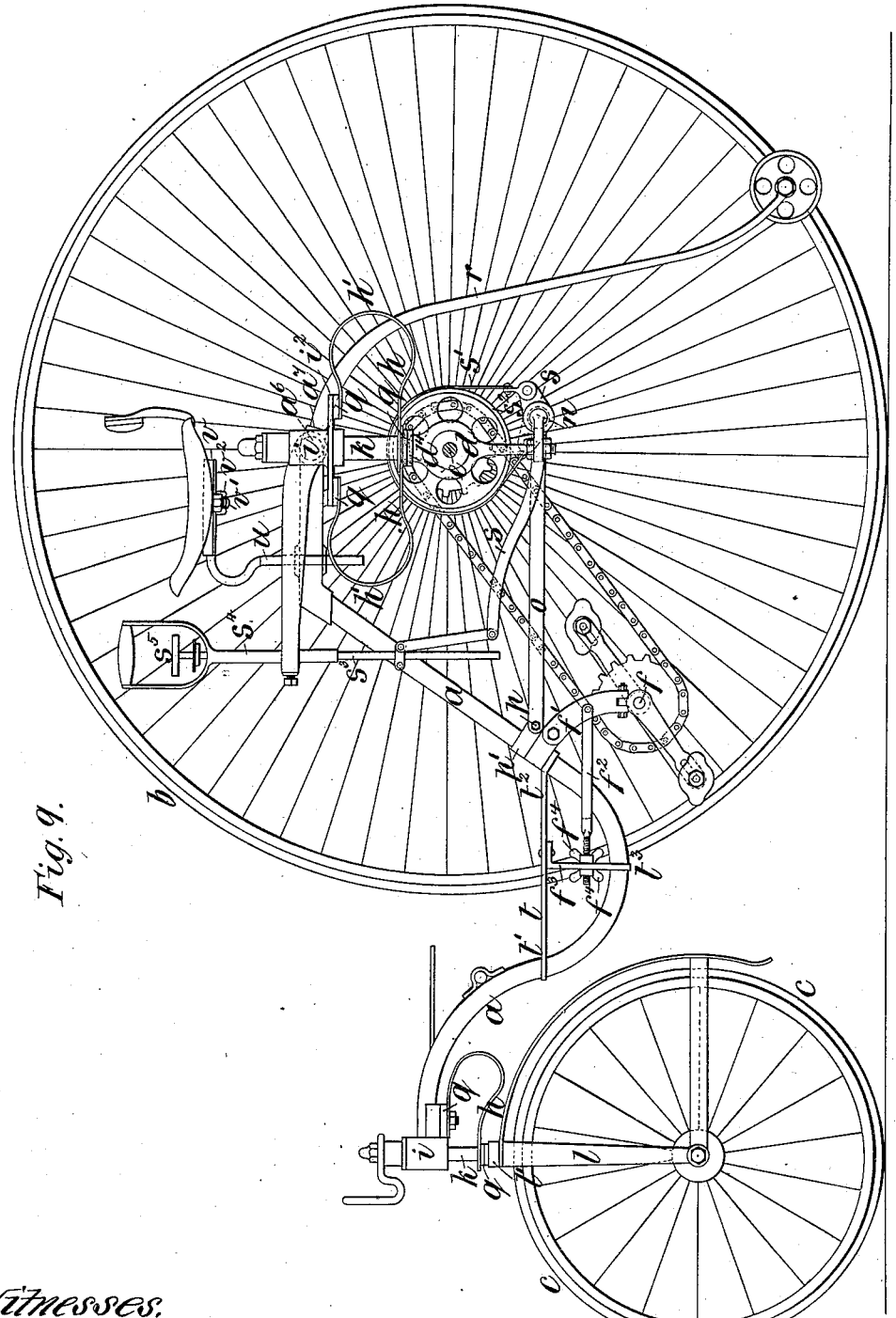

(No Model.) 8 Sheets—Sheet 6.
D. WIGGINS.
VELOCIPEDE.

No. 358,178. Patented Feb. 22, 1887.

Witnesses.
Jo. L. Coombs
Robert Pratt

Inventor.
David Wiggins.
By James L. Norris.
Atty.

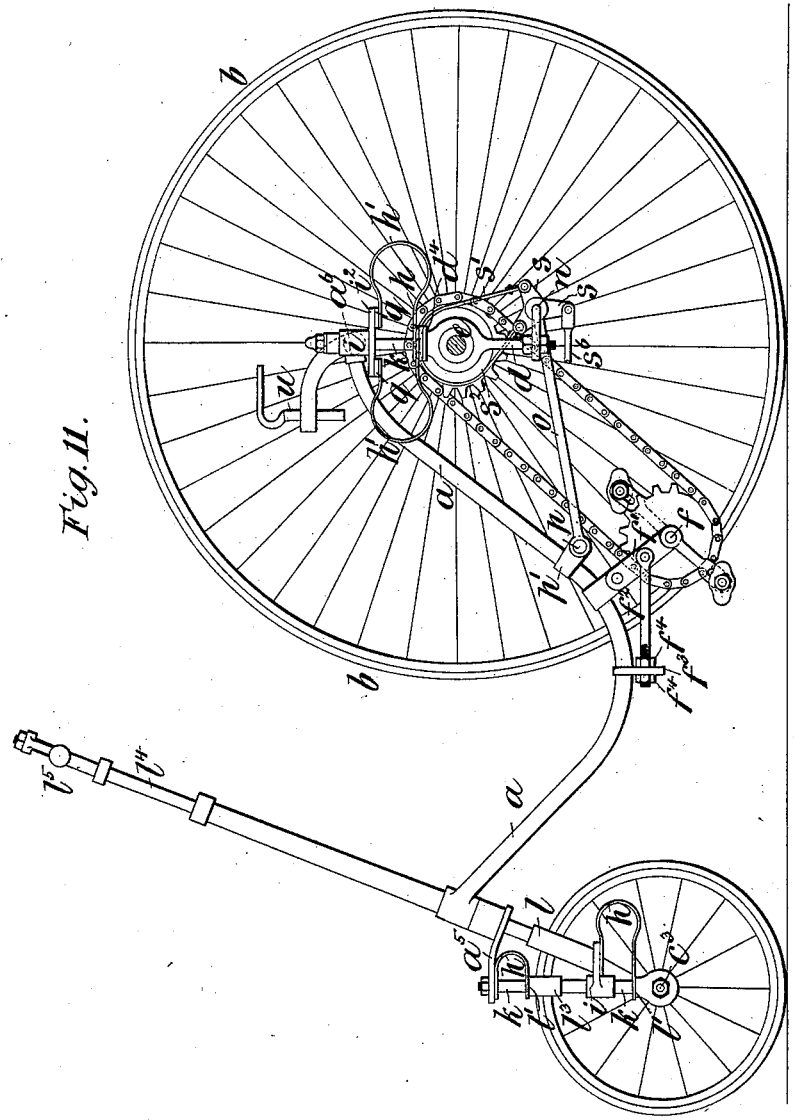

(No Model.) 8 Sheets—Sheet 8.
D. WIGGINS.
VELOCIPEDE.
No. 358,178. Patented Feb. 22, 1887.
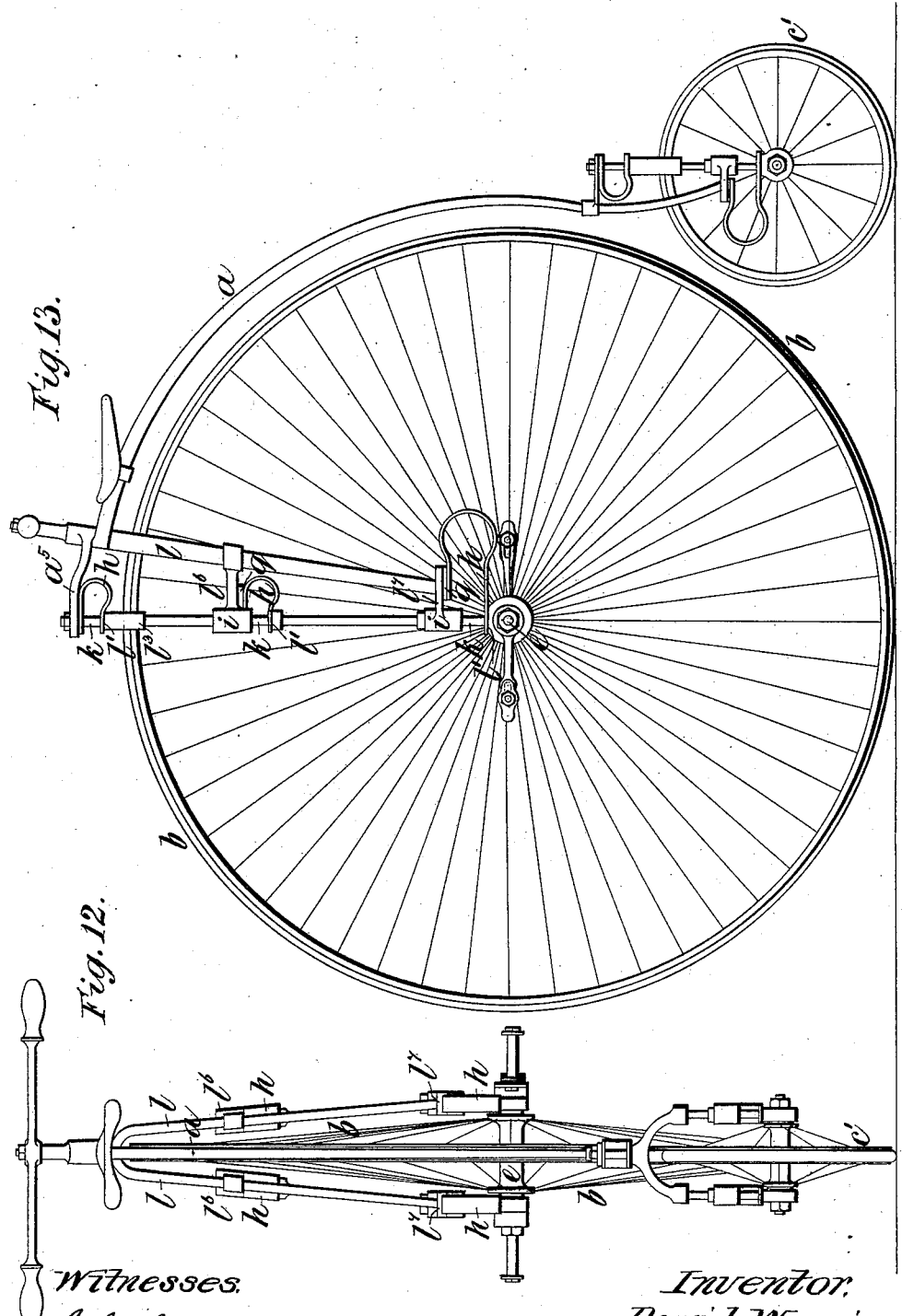
Witnesses.
Jo. L. Coombs
Robert Everett
Inventor.
David Wiggins.
By James L. Norris.
Atty.

UNITED STATES PATENT OFFICE.

DAVID WIGGINS, OF LONDON, ENGLAND, ASSIGNOR TO WILLIAM LEE, OF SAME PLACE.

VELOCIPEDE.

SPECIFICATION forming part of Letters Patent No. 358,178, dated February 22, 1887.

Application filed June 15, 1886. Serial No. 205,262. (No model.) Patented in England March 24, 1885, No. 3,811, and in Germany October 14, 1885, No. 36,068.

*To all whom it may concern:*

Be it known that I, DAVID WIGGINS, a subject of the Queen of Great Britain, and a resident of London, England, have invented new and useful Improvements in Velocipedes, (for which patents have been obtained in Great Britain, No. 3,811, bearing date March 24, 1885, and in Germany, No. 36,068, bearing date October 14, 1885,) of which the following is a specification, reference being had to the accompanying drawings.

My invention relates to velocipedes, and its object is to provide improved means for diminishing the jars or shocks occasioned by inequalities of the roads upon which such vehicles are required to travel.

My said invention is applicable either to specially-constructed or to existing velocipedes.

Figure 1:
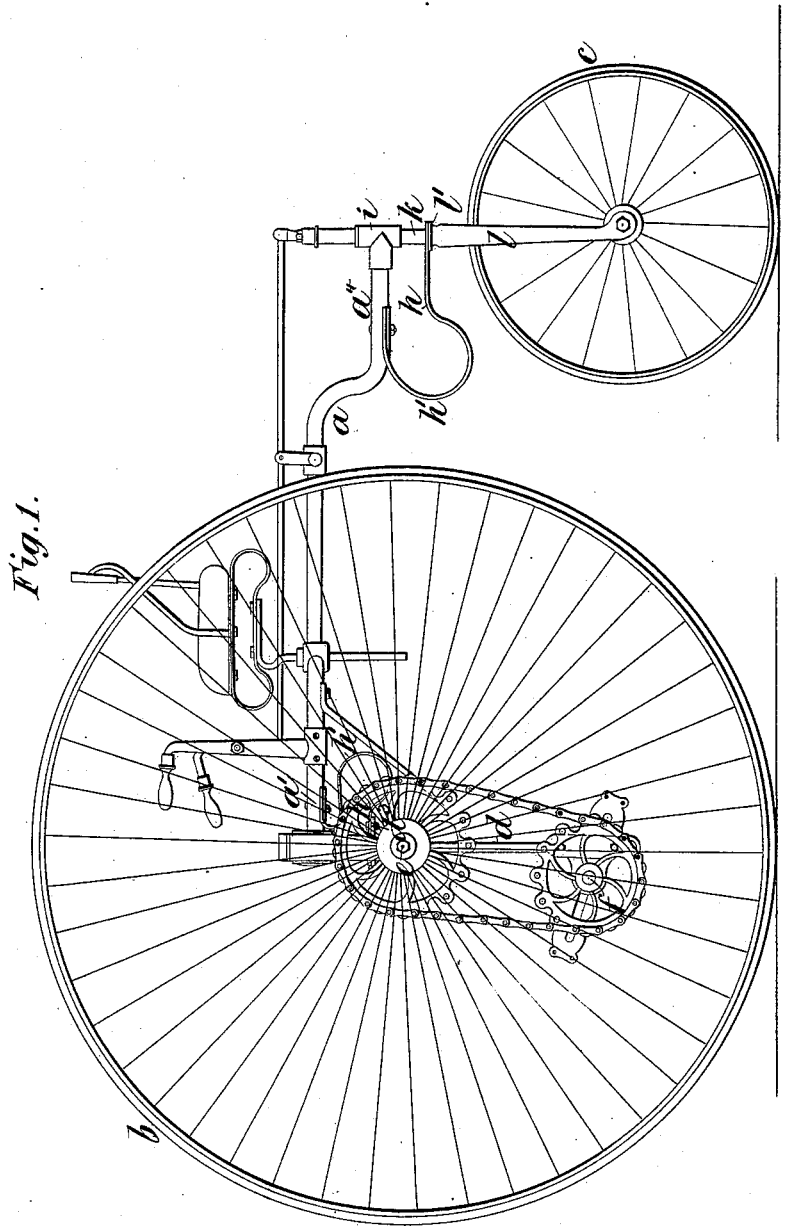
Figure 10:
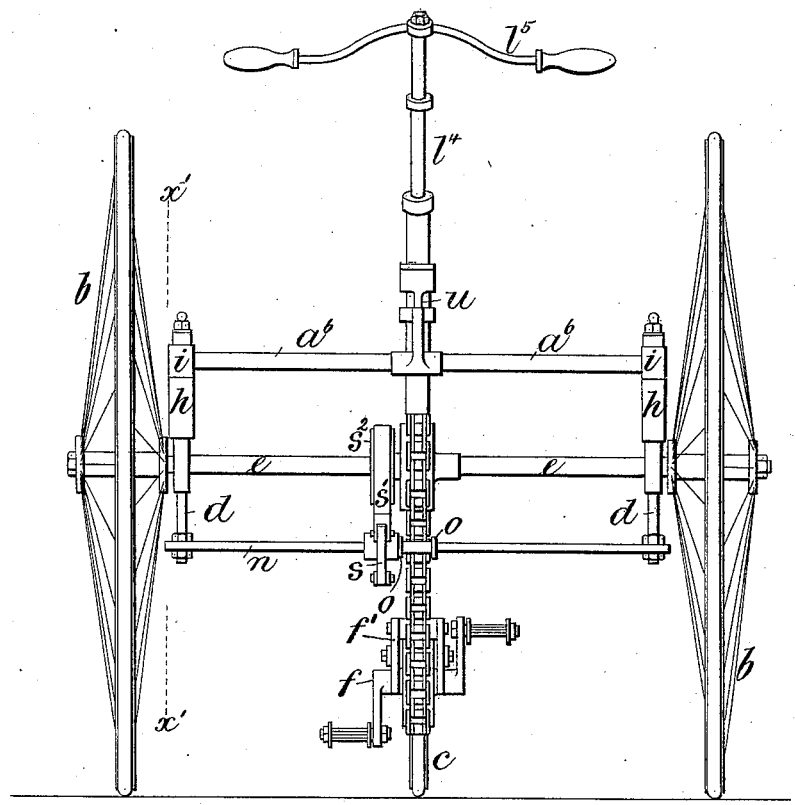

In the accompanying drawings, Figure 1 is a side elevation of a "rear-steering" tricycle with my improvements applied thereto. Fig. 2 is a sectional elevation, and Fig. 3 a rear elevation, both drawn to an enlarged scale, showing the mode of connecting the driving-wheels with the frame. Fig. 4 is a side elevation, and Fig. 5 a rear elevation, also drawn to an enlarged scale, showing the connection between the frame and the steering-wheel. Fig. 6 is a side elevation of a bicycle with my improvements applied thereto, and Fig. 7 is a rear elevation of a part of the said bicycle. Fig. 8 is a rear elevation of a "front-steering" tricycle with my improvements applied thereto. Fig. 9 is a side elevation of the same, partly in section, on the line $x\ x$, Fig. 8. Fig. 10 is a rear elevation of a "Cripper" tricycle with my improvements applied thereto. Fig. 11 is a side elevation of the same, partly in section, on the line $x'\ x'$, Fig. 10. Fig. 12 is a rear elevation, and Fig. 13 a side elevation, of another bicycle with my improvements applied thereto. Figs. 14 to 18 are different views showing details of construction. Fig. 19 is a transverse section of part of a wheel with the tire secured to the felly, as hereinafter described.

Like letters indicate corresponding parts throughout the drawings.

$a$ indicates the backbone or frame of the machine, $b\ b$ are the driving-wheels, and $c$ is the steering or guiding wheel.

$d\ d$ are two bars or posts, which, in the velocipede shown in Figs. 1 to 5, are carried by the axles $e\ e$, and have in their lower ends bearings for the crank-shaft or treadle-shaft $f$. In the velocipede shown in these figures each of these bars has two slots, $d'\ d^2$. Each of the parts $a'$ of the frame $a$ is provided with a head or block, $a^2$, which is fitted to slide up and down in the slot $d'$ of the corresponding bar or post, and has flanges $a^3$ which hold it securely within the said slot. A rod, $g$, is, moreover, attached to each part $a'$ of the frame and extends downward at an acute angle thereto. The lower extremities of the rods $g$ are fitted to slide up and down within the slots $d^2$.

$h\ h$ are curved springs, which are secured to the parts $a'$ of the frame $a$ and bear upon shoulders or brackets $d^3$ on the bars or posts $d$. These springs are preferably made from flat steel bars bent into the form shown. The said springs may, however, be of the same shape as the spring for the steering-wheel, hereinafter described.

The part $a^4$ of the frame $a$ is provided with a socket, $i$, which is fitted to slide up and down upon a parallel pin, $k$, fixed in or forming part of the forked piece $l$. A spring, $h$, is attached at one end to the part $a^4$, and bears at its other end upon a collar or flange, $l'$, on the said forked piece $l$, as shown in Figs. 4 and 5. The spring $h$ is made with two flat or straight portions, one of which bears upon the top of the fork and the other of which is secured to the frame of the vehicle. Between these two straight portions there is a circular or C-shaped part or loop, $h'$, which constitutes the elastic portion of the spring. The pin $k$ is capable of turning freely in the socket $i$ to permit the steering of the tricycle.

I have found that the peculiarly-shaped spring $h$, when used in combination with the socket $i$ and parallel pin $k$, is especially advantageous for the purpose of my invention; but I sometimes use other springs in combination with the said socket and pin. It is obvious that this combination of parts—that is to say, the socket $i$, parallel pin $k$, and the spring—is also applicable to the steering or guiding wheels of invalid-chairs or other vehicles.

By the means above described I provide an elastic connection between the frame and the wheels of the velocipede, and if the springs should break the machine will not be incapacitated, but will still be as serviceable as any ordinary velocipede without springs, because the heads $a^2$ and rods $g$ will then rest upon the bars or posts $d$ at the bottom of the slots $d'$ $d^2$. It will be seen that in the case of the driving-wheels the peculiar construction and arrangement of the parts permits the movement of the frame relatively to the wheels without varying the tension of the driving-chain or affecting its action. Moreover, the rods $g$, which slide in the slots $d^2$, add greatly to the strength and rigidity of the vehicle.

I prefer to make the socket $i$ in such a manner that it will be in contact with the pin $k$ only for a short distance from each of its extremities, as indicated by dotted lines in Fig. 4. I thus reduce the extent of rubbing surfaces between the said socket and pin.

In Figs. 6 and 7 the backbone $a$ of the bicycle is made with a socket, $i$, at its upper end. This socket is fitted upon a parallel pin, $k$, at the top of the fork $l$, which is carried by the axle $c$ of the driving-wheel $b$. A hole is formed in the socket $i$ and a pin, $i'$, is passed through the same and secured in the parallel pin $k$. By these means the wheel is prevented from being turned too far round in steering the bicycle. The pin $i'$ also serves as the support for the spoon-brake when such brake is employed. A spring, $m$, is attached at one end to the under side of the backbone $a$, and bears at its other end upon a collar or shoulder, $l'$, at the top of the fork $l$. The rear or lower end of the backbone $a$ is cut off slightly above the trailing wheel $c'$, and a forked piece, $l^2$, is secured to the said backbone. This forked piece is made with two sockets, $i$, each of which is fitted to slide upon a parallel pin, $k$, forming part of one of the limbs or prongs of another forked piece, $l^3$. This forked piece $l^3$ is carried by the axle $c^2$ of the trailing wheel, and its upper end is fitted, with a capability of vertical movement in an arm, $a^5$, secured to the backbone $a$. The arrangement of this arm, in combination with the forked piece $l^3$, as above described, imparts additional strength to the vehicle. The arm $a^5$ is fitted to slide up and down upon a parallel pin, $k$, at the top of the fork $l^3$, and a spring, $h$, is preferably attached to the under side of the arm $a^5$ and arranged to bear upon a shoulder, $l'$, on the fork $l^3$. A spring, $h$, is also attached to the forked piece $l^2$ on each side of the trailing wheel $c'$, and bears upon a collar or shoulder, $l'$, on the forked piece $l^3$. These springs form elastic connections between the trailing wheel and the backbone, and their breakage will not render the bicycle unserviceable.

In the velocipedes shown in Figs. 8 to 11 the two bars or posts $d$ carry the ball or other bearings for the driving-axle $e$. Each post $d$ is provided at its upper end with a parallel pin, $k$, on which is fitted to slide a socket or sleeve, $i$, formed on or attached to a cross-piece, $a^6$, firmly attached to the backbone or frame $a$, or forming a part of the said frame. The bars or posts $d$ are, moreover, united at their lower ends by a cross-bar, $n$, which is connected with the backbone or frame $a$ by means of links or slings $o$. These links or slings are pivoted upon the cross-bar $n$ and upon a bolt, $p$, passed through a bracket, $p'$, attached to the backbone or frame $a$. They, therefore, firmly connect the posts $d$ with the backbone or frame $a$, and prevent any displacement of the said posts, while permitting the vertical movement of the backbone or frame independently of the axle when the springs are compressed by the rider's weight or otherwise, the links or slings $o$ turning upon or about the cross-bar $n$ when the springs are thus compressed. In a tricycle with a "loop-frame," these slings are placed at or near the end of the cross-bar $n$ instead of near the center thereof.

In combination with each parallel pin $k$ and socket $i$, I employ two springs, $h$, having circular or C-shaped portions $h'$, as above described; but, as two of these springs are employed, they can be made considerably lighter than when only one is used. The lower end of each spring is passed over the parallel pin $k$, and rests on the shoulder $d^4$ of the post $d$. The upper ends of the springs $h$ are secured to an arm or cross-bar, $i^2$, at the lower end of the socket $i$.

Other springs can, if desired, be used in place of those shown in the drawings, or a single spring may be used in combination with each of the posts $d$, for the purpose of my invention.

I sometimes place between the springs $h$ and posts $d$, or between the said springs and the cross-bar $i^2$, cushions $q$, of india-rubber or other elastic material, to assist in diminishing the jars or shocks occasioned by inequalities of the roads over which the vehicle has to travel. This part of my invention is applicable in all cases where my springs are used.

I prefer to make the cross bar $a^6$ with a socket or arm, $a^7$, Figs. 8 and 9, to which is attached the trailing rod $r$, for preventing the tipping of the vehicle.

The cross-bar $n$ is preferably made in separate parts or sections, united at $n'$ by means of a bolt, or in any other suitable manner, as shown in Figs. 8 and 9, for convenience in taking to pieces. It may, however, if desired, be made in one piece, as shown in Figs. 10 and 11. I fit upon this cross-bar a lever, $s$, which has two short arms coupled one to each end of the strap $s'$, which surrounds the brake-drum $s^2$ on the axle $e$. Any suitable means are provided for operating the brake through the medium of the lever $s$. In the tricycle shown in Figs. 8 and 9 I use a rod $s^3$, passing through a tube, $s^4$, and provided with a handle, $s^5$, for pulling it upward. In the tricycle shown in Figs. 10 and 11 the lever $s$ is connected by a link, $s^6$, with a system of levers operated by a hand-lever pivoted to the steering-handle in a well-known manner.

In Figs. 8 and 9, $t$ is a strut or bar, which is secured to the backbone $a$ at $t'$ $t^2$. This strut is preferably made of channel-iron. It greatly strengthens the frame of the machine, and serves as a step for use in mounting or alighting from the seat or saddle.

The treadle-shaft $f$ is supported in a forked arm, $f'$, pivoted to or suspended from the backbone $a$. To this arm is coupled a screw-threaded bar or rod, $f^2$. The screw-threaded end of this bar or rod is passed through a bar, $f^3$, connecting the strut or bar $t$ with the backbone $a$ at $t^3$. Two thumb-nuts, $f^4$, are screwed upon the rod $f^2$, one on each side of the bar $f^3$. By means of these nuts the treadle-shaft $f$ can be readily adjusted to regulate the tension of the driving-chain according to the weight of the rider. The strut or bar $t$ serves to cover these nuts and prevent engagement thereof with the rider's dress. The bar $f^3$, in addition to forming a support for the rod $f^2$, further strengthens the backbone or frame.

I sometimes provide other suitable means whereby the treadle-shaft can be readily moved toward or away from the axle of the driving-wheels to regulate the tension of the chain. In some instances the said forked arm $f'$ is pivoted to or suspended from the links or slings $o$, which connect the posts with the backbone.

I sometimes dispense with springs between the seat or saddle and the backbone or frame when the machine is fitted with my springs between the frame and the axle. If desired, however, springs may also be used between the saddle and the backbone or frame.

To provide for the adjustment of the seat or saddle, and at the same time provide a rigid saddle-support, I employ a bent rod or bar, $u$, which is passed through and secured in any convenient manner in the backbone $a$. The upper end of the rod or bar $u$ is formed with a slot, $u'$, and a grooved plate or frame, $v$, for the seat or saddle is fitted to slide longitudinally to and fro upon the said rod or bar. A screw-bolt, $v'$, is passed through the plate $v$ and through the slot in the bar $u$, and is provided with a nut, $v^2$, for securing the said plate in any desired position. If the nut should become slack, the saddle cannot turn on its support like those heretofore used.

The steering-wheel $c$, Figs. 8 and 9, is provided with a forked piece, $l$, having a parallel pin, $k$, at its upper end. A socket, $i$, fixed or formed on the backbone $a$, is fitted to slide up and down upon the pin $k$, and a spring, $h$, is arranged between the said backbone and the shoulder $l'$ of the forked piece $l$, substantially as above described, with reference to the rear-steering tricycle. (Shown in Figs. 1 to 5.)

I sometimes insert washers $q$, of india-rubber or other elastic material, between the spring $h$ and the backbone $a$, or between the said spring and the shoulder of the forked piece $l$, or in both of these places.

In the tricycle shown in Figs. 10 and 11 the spindle $l^4$ of the steering-handle $l^5$ carries at its lower end the forked piece $l$, and is fitted to turn in one end of an arm, $a^5$, which at its other end is fitted to slide up and down upon a parallel pin, $k$, at the top of another forked piece, $l^3$, carried by the axle $c^3$ of the steering-wheel $c$. A spring, $h$, is fitted between the arm $a^5$ and the shoulder $l'$ of the said forked piece $l^3$. The forked piece $l$ is provided with two sockets, $i$, each of which is fitted to slide up and down upon a parallel pin or rod $k$, forming part of the forked piece $l^3$. A spring, $h$, is arranged between each of these sockets and the corresponding shoulder, $l'$, on the forked piece $l^3$. By these means the vibration of the steering-handle is considerably diminished, thus obviating the stiffness in the rider's arms and hands usually experienced by reason of such vibration.

In the bicycle shown in Figs. 12 and 13 the backbone $a$ is provided with an arm, $a^5$, which at its extremity is fitted upon a parallel pin, $k$, at the top of a forked piece, $l^3$, carried by the axle $e$ of the driving-wheel $b$. A spring, $h$, is fitted between the arm $a^5$ and the shoulder $l'$ of the forked piece $l^3$. The ordinary forked piece $l$ of the bicycle is provided on each side with two arms, $l^6$ $l^7$, furnished at their ends with sockets $i$, which are fitted to slide up and down upon parallel pins or parallel portions $k$ of the forked piece $l^3$. Between these arms and sockets and the shoulders $l'$ of the said forked piece $l^3$ are fitted springs $h$. The trailing wheel of this bicycle is provided with forked pieces having parallel sockets and springs, substantially as above described.

The india-rubber tires commonly used on the wheels of velocipedes are liable to slip off the same, and thereby cause great inconvenience to the rider. To obviate this defect, I securely attach the tire to the felly of the wheel by means of screws, bolts, or rivets passed through holes in the felly and in the tire.

In Fig. 19, $b'$ is the felly, and $b^2$ is the tire. $b^3$ is one of the rivets which are passed through the said tire and felly for securing the said tire in place.

By attaching the tire to the felly in this manner at, say, four points I limit the extent to which the said tire can be slackened—that is to say, when the tire is slackened by reason of the high speed at which the wheel is running, or by reason of the sudden application of the brake when the wheel is running at a high speed, the slackness thus occasioned can only extend around one-fourth of the periphery of the wheel. Therefore the tire cannot come off the felly at any point.

When a rider mounts a velocipede constructed as above described, the springs will be more or less compressed, and when any upward pressure is exerted on the wheels of the said velocipede the said springs will yield, and thus avoid or considerably diminish any shocks or concussion due to inequalities of the road upon which the velocipede is used.

The strength and form of the springs can be somewhat varied, according to the weight which the velocipede is designed to carry, or according to other circumstances.

My improvements considerably facilitate the steering of a velocipede by reducing the friction between the backbone or frame and the fork of the steering-wheel. They also greatly increase the comfort of the rider as compared with ordinary velocipedes.

What I claim is—

1. In a velocipede, the combination, with the backbone or frame and the driving-axle, of springs having circular or C-shaped portions, substantially as described, and bearing at their lower ends upon bars or posts carrying the bearings for said axle, and at their upper ends against parts of said backbone or frame, which are so connected with said bars or posts that said axle is capable of vertical movement independently of said backbone or frame, substantially as and for the purposes set forth.

2. In a velocipede, the combination of the bars or posts $d$, carrying the bearings for the axle $e$, and provided with the parallel pins $k$, the backbone or frame $a\,a^6$, provided with the sockets $i$, fitted to slide up and down upon said parallel pins, and springs arranged between said sockets and the shoulders $d^3$ on said bars or posts, substantially as and for the purposes set forth.

3. In a velocipede, the combination of the bars or posts $d$, carrying the bearings for the axle $e$, and provided with the parallel pins $k$, the backbone or frame $a\,a^6$, provided with the sockets $i$, fitted to slide up and down upon said parallel pins, and two springs, $h$, having circular or C-shaped portions $h'$, arranged between each of said sockets and the corresponding bar or post, $d$, substantially as and for the purpose set forth.

4. In a velocipede, the combination, with the backbone or frame $a\,a^6$, and the bars or posts $d$, carrying the bearings for the axle $e$, of the cross-bar $n$, uniting said posts or bars, the links or slings $o$, connecting said cross-bar with said backbone or frame, and springs for supporting said backbone or frame upon said bars or posts, substantially as and for the purpose set forth.

5. In a velocipede, the combination of the backbone or frame $a$, the bars or posts $d$, the axle $e$, supported in said posts, the cross-bar $n$, links $o$, brake-drum $s^2$, fixed on the axle, a strap, $s'$, surrounding said drum, a lever, $s$, pivoted on said cross-bar, means for connecting said lever and strap, and means for operating the lever, substantially as and for the purpose set forth.

6. In a velocipede in which the backbone or frame is bent downward between the front and rear wheels, a strut or bar, $t$, secured to said backbone or frame across the bend thereof to strengthen the same and serving as a step, the bar $t^3$ being used, if desired, to further strengthen said backbone or frame and said strut or bar, all substantially as set forth.

7. In a velocipede, a saddle-support consisting of a slotted bent bar, $u$, adjustably secured in the backbone or frame $a$, and a grooved plate, $v$, fitted to slide to and fro upon said bar, and provided with a screw-bolt or other suitable means for securing it in any desired position thereon, substantially as and for the purpose set forth.

8. In a velocipede, the combination, with the forked rod $l$, of the additional or supplementary forked rod $l^3$, the parallel pins or rods $k$, the sliding sockets $i$, and the springs $h$, having the circular or C-shaped portions $h'$, substantially as and for the purpose set forth.

9. The combination, with the backbone or frame $a$, the springs $h$, and the posts $d$, provided with the shoulders $d^3$, of the elastic washers or cushions $q$, arranged between said springs and said shoulders $d^3$, substantially as and for the purpose set forth.

In testimony whereof I have hereunto signed my name in the presence of two subscribing witnesses.

DAVID WIGGINS.

Witnesses:
  DAVID YOUNG,
  WALTER MORRIS.